US008922584B2

(12) United States Patent
Sigal

(10) Patent No.: US 8,922,584 B2
(45) Date of Patent: Dec. 30, 2014

(54) METHOD OF CREATING, DISPLAYING, AND INTERFACING AN INFINITE NAVIGABLE MEDIA WALL

(76) Inventor: Frederic Sigal, Paris (FR)

(*) Notice: Subject to any disclaimer, the term of this patent is extended or adjusted under 35 U.S.C. 154(b) by 113 days.

(21) Appl. No.: 13/250,233

(22) Filed: Sep. 30, 2011

(65) Prior Publication Data

US 2013/0083051 A1    Apr. 4, 2013

(51) Int. Cl.
*G09G 5/00* (2006.01)
*G06F 17/30* (2006.01)

(52) U.S. Cl.
CPC .................. *G06F 17/30061* (2013.01)
USPC ............................ 345/619; 345/600; 345/672

(58) Field of Classification Search
None
See application file for complete search history.

(56) References Cited

U.S. PATENT DOCUMENTS

| | | | |
|---|---|---|---|
| 6,532,312 B1* | 3/2003 | Corkran | 382/284 |
| 7,327,349 B2* | 2/2008 | Robbins et al. | 345/156 |
| 7,581,195 B2* | 8/2009 | Sciammarella et al. | 715/838 |
| 7,831,605 B2* | 11/2010 | Plastina et al. | 707/758 |
| 7,870,282 B2* | 1/2011 | Jonsson et al. | 709/231 |
| 8,234,586 B2* | 7/2012 | Glein | 715/810 |
| 8,291,349 B1* | 10/2012 | Park et al. | 715/863 |
| 8,352,479 B2* | 1/2013 | Bedingfield, Sr. | 707/755 |
| 2004/0078357 A1* | 4/2004 | LaChapelle et al. | 707/2 |
| 2005/0206658 A1* | 9/2005 | Fagans | 345/660 |
| 2005/0270311 A1* | 12/2005 | Rasmussen et al. | 345/677 |
| 2005/0283734 A1* | 12/2005 | Santoro et al. | 715/765 |
| 2006/0195514 A1* | 8/2006 | Rogers et al. | 709/203 |
| 2008/0122870 A1* | 5/2008 | Brodersen et al. | 345/634 |
| 2008/0188209 A1* | 8/2008 | Dorogusker et al. | 455/414.2 |
| 2009/0067738 A1* | 3/2009 | Fuchie et al. | 382/251 |
| 2009/0113315 A1* | 4/2009 | Fisher et al. | 715/758 |
| 2009/0132197 A1* | 5/2009 | Rubin et al. | 702/141 |
| 2009/0198359 A1* | 8/2009 | Chaudhri | 700/94 |
| 2009/0295826 A1* | 12/2009 | Good et al. | 345/619 |
| 2010/0053220 A1* | 3/2010 | Ozawa et al. | 345/661 |
| 2010/0114846 A1* | 5/2010 | LaChapelle et al. | 707/693 |
| 2010/0306249 A1* | 12/2010 | Hill et al. | 707/769 |
| 2010/0313135 A1* | 12/2010 | Johnson et al. | 715/738 |
| 2011/0145327 A1* | 6/2011 | Stewart | 709/203 |
| 2011/0173163 A1* | 7/2011 | LaChapelle et al. | 707/693 |
| 2011/0193881 A1* | 8/2011 | Rydenhag | 345/647 |
| 2011/0316888 A1* | 12/2011 | Sachs et al. | 345/156 |
| 2012/0035881 A1* | 2/2012 | Rubin et al. | 702/141 |
| 2012/0060095 A1* | 3/2012 | Klappert | 715/722 |
| 2012/0075351 A1* | 3/2012 | Imai et al. | 345/684 |
| 2012/0114302 A1* | 5/2012 | Randall | 386/241 |
| 2012/0188286 A1* | 7/2012 | Groth et al. | 345/670 |
| 2012/0192110 A1* | 7/2012 | Wu | 715/815 |
| 2013/0033525 A1* | 2/2013 | Markiewicz et al. | 345/684 |

\* cited by examiner

*Primary Examiner* — Ryan R Yang
(74) *Attorney, Agent, or Firm* — Basil M. Angelo

(57) ABSTRACT

A computer implemented method of creating, displaying, and interfacing an infinite navigable media wall includes identifying available media from storage accessible by the computer, generating a logical set of media from the available media, generating the infinite navigable media wall by placing graphical representations of media in the logical set of media on a display of the computer, and displaying the infinite navigable media wall on the display of the computer.

28 Claims, 11 Drawing Sheets

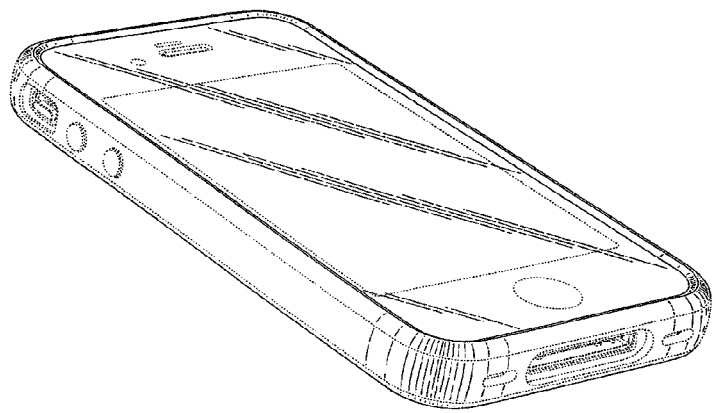
*FIG. 1A*
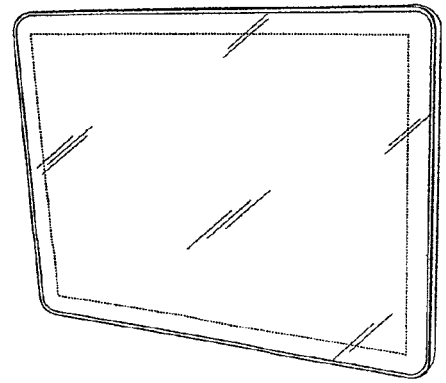
*FIG. 1B*
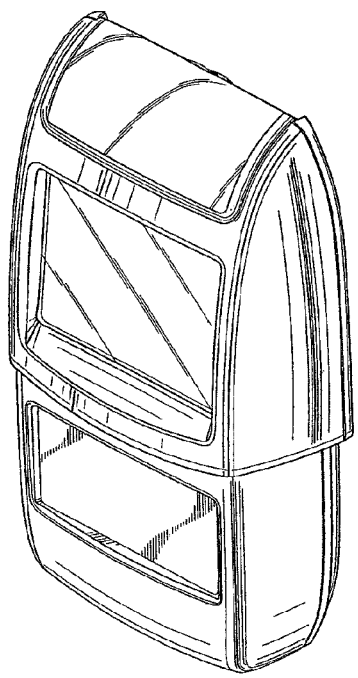
*FIG. 1C*
FIG. 1
PRIOR ART

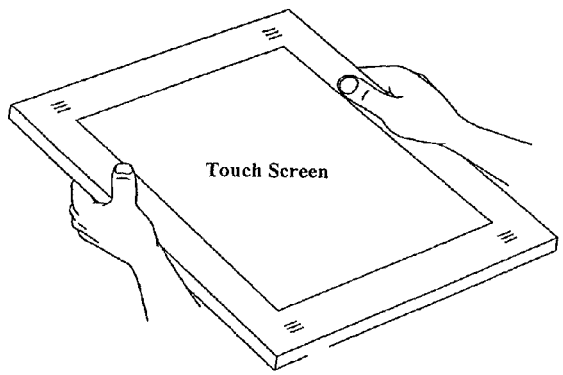
FIG. 2A
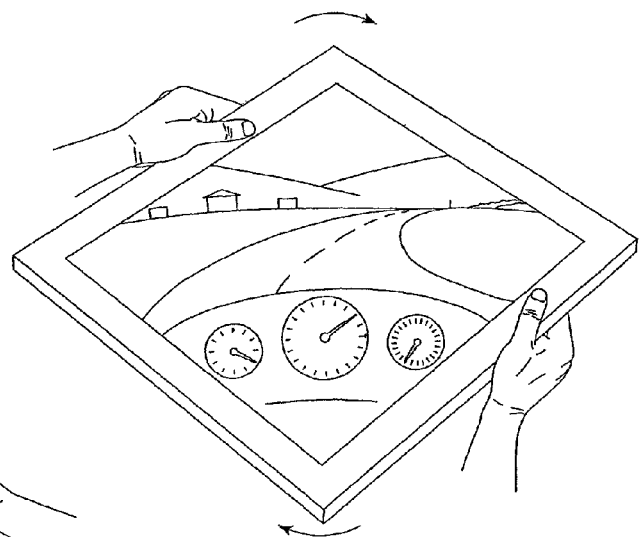
FIG. 2B
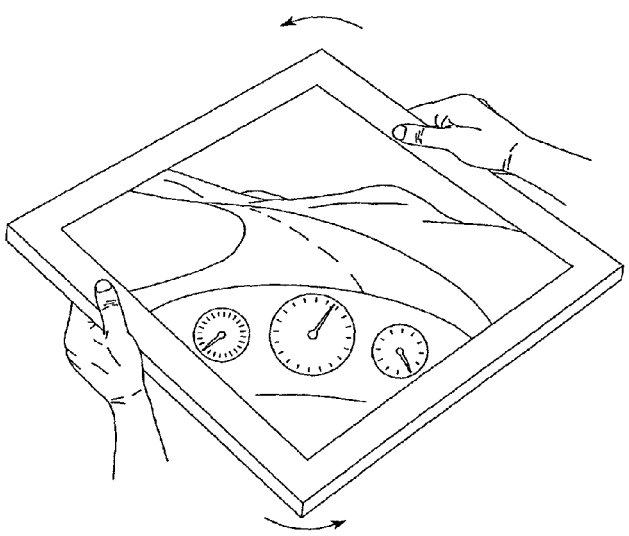
FIG. 2C
FIG. 2
PRIOR ART

FIG. 4A  FIG. 4B
FIG. 4

METHOD OF CREATING, DISPLAYING, AND INTERFACING AN INFINITE NAVIGABLE MEDIA WALL

BACKGROUND OF INVENTION

Modern computers are capable of retrieval, storage, manipulation, display, and transmission of media files. Conventional computers include tablets, laptops, desktops, servers, kiosks, television sets, projectors, and handheld form factor devices including smartphones. Each of these computers typically includes one or more processors, storage devices, network interfaces, displays, human-computer interfaces, and operating systems that serve as an interface between application software and the hardware of the computer. Storage devices include computer-readable medium that contains software instructions executed by the processor of the computer.

Conventional media files include audio, video, graphic, document, and other files that store relevant media data. Exemplars of audio media include MP3, AAC, AIFF, WMA, and WAV file formats. Exemplars of video media include MP4, MOV, AVI, WMV, and FLV file formats. Exemplars of graphic media include JPG, PNG, IMG, GIF, TIF, and BMP file formats. Exemplars of documents include TXT, RTF, DOC, WPD, and PDF file formats. Exemplars of other files include HTML and XML files.

Recent trends in modern computers have focused on portable multi-function computing devices. FIG. 1A shows the design of Apple Inc.'s well-known iPod® and iPhone® products. These devices are portable handheld multi-function devices that include a central processing unit, a network interface, accelerometers, geolocalization, a display, and a touch screen interface. These devices are capable of retrieval, storage, manipulation, display, and transmission of media files. Apple's iPod® and iPhone® products implement a gesturing interface that allows users to interact with the iPod® and iPhone® using defined gestures entered on the touch screen interface by hand or stylus. These gestures include, for example, gestures to identify and select objects on the display, gestures to move the focal point of the display, gestures to move the display from one screen to another, and gestures to zoom in or zoom out of a given screen. FIG. 1B shows the design of Apple Inc.'s iPad® product. These devices are very similar to the iPod® and iPhone® products in composition and function, but include a larger display.

FIG. 1C shows TouchTunes Music Corporation's TouchTunes® jukebox device. These devices function as modern day jukeboxes and include a central processing unit, a network interface, a display, and a touch screen interface that is capable of retrieval, storage, manipulation, display, and transmission of media files.

FIG. 2A shows Apple Inc.'s iPad® tablet being held in the hands of a user. Apple's iPod®, iPhone®, and iPad® products utilize accelerometers for a variety of purposes. For example, the accelerometers are used to rotate the display from portrait mode to landscape mode or from landscape mode to portrait mode depending on how the user holds the device. Additionally, the accelerometers can be used to cause actions within applications running on the devices based on the users positioning of the device. FIG. 2B shows an iPad® running a driving software application. As the car approaches a right bend in the road, the user rotates the iPad® to the right to keep the car in the lane. Similarly, FIG. 2C shows a user rotating the iPad® to the left to keep the car in the lane when approaching a left bend in the road.

SUMMARY OF INVENTION

According to one aspect of one or more embodiments of the present invention, a computer implemented method of creating, displaying, and interfacing an infinite navigable media wall includes identifying available media from storage accessible by the computer, generating a logical set of media from the available media, generating the infinite navigable media wall by placing graphical representations of media in the logical set of media on a display of the computer, and displaying the infinite navigable media wall on the display of the computer.

According to one aspect of one or more embodiments of the present invention, a non-transistory computer-readable medium comprising software instructions that, when executed by a processor of a computer, perform the method of creating, displaying, and interfacing an infinite navigable media wall. The method includes identifying available media from storage accessible by the computer, generating a logical set of media from the available media, generating the infinite navigable media wall by placing graphical representations of media in the logical set of media on a display of the computer, and displaying the infinite navigable media wall on the display of the computer.

Other aspects of the present invention will be apparent from the following description and the appended claims.

BRIEF DESCRIPTION OF DRAWINGS

FIGS. 1A-1C show prior art designs for Apple Inc.'s iPod®, iPhone®, and iPad® devices and TouchTunes Music Corporation's TouchTunes® jukebox.

FIGS. 2A-2C show prior art including Apple Inc.'s iPad®, a user rotating the iPad® to the right, and a user rotating the iPad® to the left to show the use of accelerometers to interface with a software application.

FIGS. 4A-4B show a screenshot of a portrait view of an infinite navigable media wall and a screenshot of a moved infinite navigable media wall in accordance with one or more embodiments of the present invention.

DETAILED DESCRIPTION

Figure 3A:
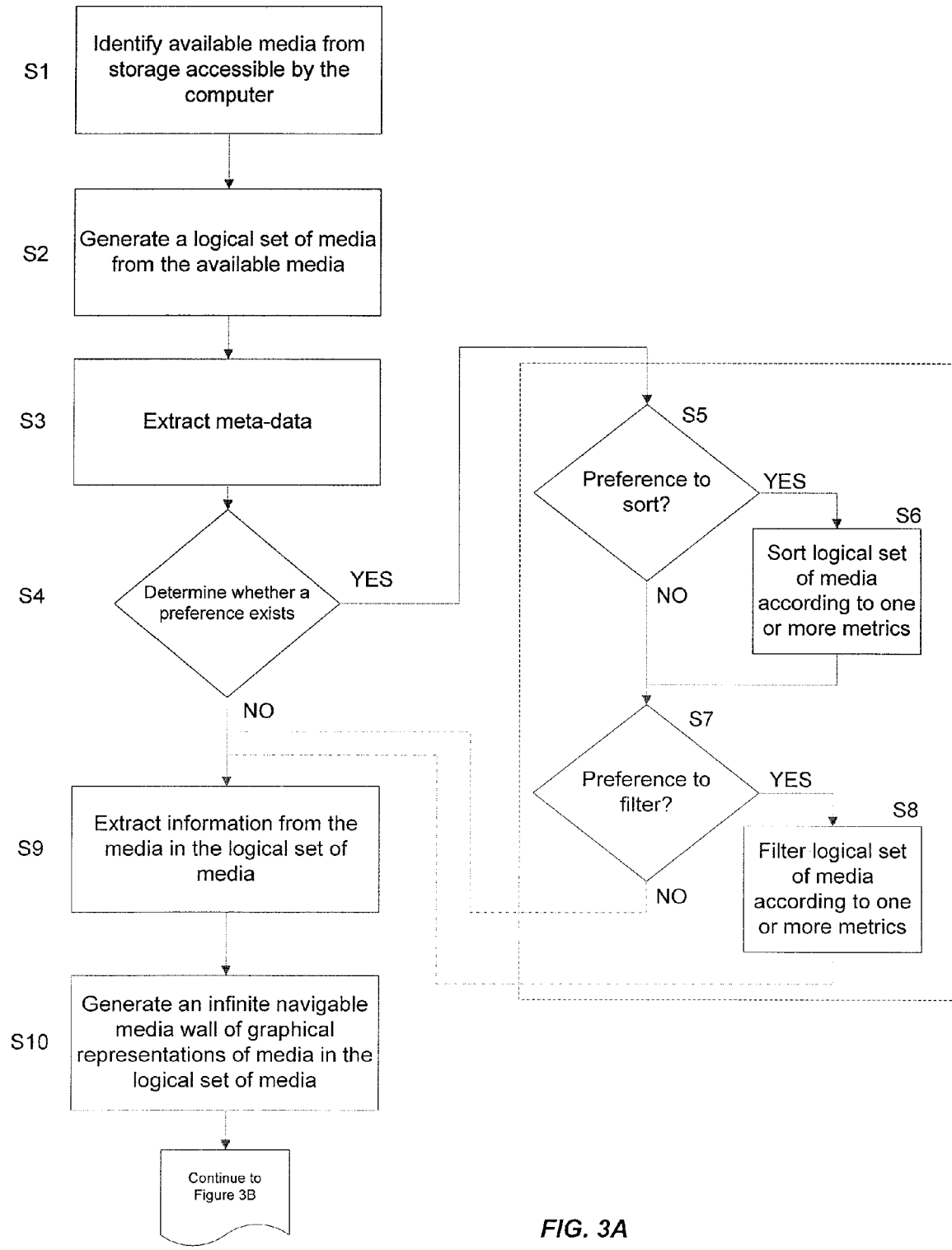
FIGS. 3A-3B show a computer method of generating, displaying, and interfacing an infinite navigable media wall in accordance with one or more embodiments of the present invention.

Specific embodiments of the present invention will now be described in detail with reference to the accompanying figures. Like elements in the various figures are denoted by like reference numerals for consistency. Further, in the following detailed description of embodiments of the present invention, numerous specific details are set forth in order to provide a more thorough understanding of the present invention. In other instances, well-known features have not been described in detail to avoid obscuring the description of embodiments of the present invention.

One or more embodiments of the present invention relate to a method of generating, displaying, and interfacing an infinite navigable media wall and computer readable medium containing software instructions that, when executed by the processor, perform the above-noted method.

FIG. 3A shows a computer implemented method of generating, displaying, and interfacing an infinite navigable media wall in accordance with one or more embodiments of the present invention. With reference to FIG. 3A, in step S1, available media is identified from storage accessible by a computer. Storage accessible by the computer includes internal storage, external storage, and/or remote storage. Internal storage includes, for example, flash memory or fixed disk storage devices that are a fixed part of the computer. External storage includes, for example, removable flash memory cards and removable fixed disk storage devices. Remote storage includes, for example, network storage devices and cloud-based storage devices. One of ordinary skill in the art will appreciate that the present invention may utilize any storage that is accessible by the computer in accordance with one or more embodiments of the present invention.

In one or more embodiments of the present invention, available media are identified from one or more local databases of the computer, i.e., internal storage, in which the identification is performed. In this way, by default, media identified by the local databases of the computer, and stored on internal storage, are classified as available media so that they may be utilized for expeditious use. Advantageously, the display of an infinite navigable media wall is expedited to improve the user experience.

In one or more embodiments of the present invention, media identified from external storage and/or remote storage may be sorted and/or filtered according to a predetermined preference established by the software application, user preferences, reported user usage metrics, or an advertising directive and are then classified as available media as soon as the identification can take place given the constraints of accessing external storage and/or remote storage. In one or more embodiments of the present invention, the identification includes identification of media by file type. In one or more embodiments of the present invention, the identification includes identification of media by meta-data. One of ordinary skill in the art will recognize that the identification may be by any relevant data related to the media in accordance with one or more embodiments of the present invention. In one or more embodiments of the present invention, available media includes media from internal storage of the computer intermingled with media from external storage and/or remote storage.

In one or more embodiments of the present invention, geolocalization of the computer may be utilized to customize the available media identified from remote storage. For example, geolocalization may be utilized to identify a country, state, city, or other information relating to the present location of the computer. The geolocalization information may then be used to tailor the available media from remote storage. For example, a user in the United States, through geolocalization, would be presented with media in the English language and any links to purchase media would be directed to such media from a third-party that sells the English language media. Similarly, a user in France, through geolocalization, would be presented with media in the French language and any links to purchase media would be directed to such media from a third-party that sells the French language media. In one or more embodiments of the present invention, geolocalization may be utilized to synchronize the presentation remote media based on the user's location. For example, a user browsing a physical store may be presented with an infinite navigable media wall that is customized based on the user's location in the physical store. In this way, the user may sample media, purchase media, or otherwise manipulate media based on their location by use of remote storage. One of ordinary skill in the art will recognize that geolocalization may be utilized to adapt media in the logical set of media in others ways in accordance with one or more embodiments of the present invention.

In step S2, a logical set of media is generated from the available media. This logical set includes all media identified in step S1, regardless of whether the media originates from internal storage, external storage, or remote storage. One of ordinary skill in the art will appreciate that at run-time, immediately after launch of the application, the available media identified in step S1 may be limited to media from internal storage, and the available media may be supplemented by media from external storage and/or remote storage as it becomes available and in accordance with one or more user preferences.

In step S3, meta-data is extracted from the media in the logical set of media. The meta-data is extracted from the actual media files corresponding to the media in the logical set of media or separate, but related, XML files that contain meta-data about the media in the logical set of media. In step S4, a determination is made as to whether there is a preference expressed that affects the logical set of media. In one or more embodiments of the present invention, a preference may be indicated by user interaction with the software application. In one or more embodiments, a preference may be indicated by a last state of the software application during a previous execution of the software application.

In step S5, a determination is made as to whether a preference exists to sort the logical set of media according to one or more metrics. For example, a preference may be to sort the logical set of media according to a file type, file name, or any other metric that may be relevant to the media at hand. In the case of audio media, the preference may be, for example, to sort the logical set of media according to artist, album, song, title, genre, year, or rating. In the case of video media, the preference may be, for example, to sort the logical set of media according to title, genre, year, actor, or director. One of ordinary skill in the art will recognize that sorting means arranging the media in the logical set of media in accordance with the sorting preference. Additionally, one of ordinary skill in the art will recognize that the sorting of the logical set of media includes sorting by any metric cognizable from the media in the logical set of media, meta-data of the media in the logical set of media, or separate, but related, XML files that contain meta-data about the media in the logical set of media. In step S6, if it is determined that a preference exists to sort the logical set of media in step S5, the logical set of media is sorted according to one or more expressed sorting metrics.

In step S7, a determination is made as to whether a preference exists to filter the logical set of media according to one or more metrics. For example, a preference may be to filter the logical set of media according to a file type, file name, or any other metric that may be relevant to the media at hand. In the case of audio media, the preference may be, for example, to filter the logical set of media according to artist, album, song, title, genre, year, or rating. In the case of video media, the preference may be, for example, to filter the logical set of media according to title, genre, year, actor, or director. One of ordinary skill in the art will recognize that filtering means excluding from the logical set of media the media that do not meet the filtering preference. Additionally, one of ordinary skill in the art will appreciate that the filtering of the logical set of media includes filtering by any metric cognizable from the media in the logical set of media, meta-data of the media in the logical set of media, or separate, but related, XML files that contain meta-data about the media in the logical set of media. In step S8, the logical set of media is filtered according to one or more expressed filtering metrics.

One of ordinary skill in the art will recognize that sorting without filtering, filtering without sorting, and sorting and filtering in any order may be utilized in accordance with one or more embodiments of the present invention. Additionally, one of ordinary skill in the art will recognize that sorting and filtering may be bypassed in accordance with one or more embodiments of the present invention. For example, upon initial execution of a software application that performs the method, there is no preference expressed by the last state of execution because there is none, and the user has not had an opportunity to express a preference. However, in one or more embodiments of the present invention, a preference may be established by the software application itself based upon a predetermined advertising directive or a predetermined directive of the application. For example, in the case of audio media where the available media includes media from remote storage, an advertising directive may include a preference to sort according to most popular songs, most downloaded songs, or new releases. Further, for example, if the infinite navigable media wall is configured for a specific and targeted use, i.e., a kiosk, a preference may be to sort and/or filter the media according to that specific use.

In step S9, information is extracted from the media in the logical set of media in anticipation of generating the infinite navigable media wall. For example, in the case of audio media, the information may include a graphic file representing an album cover corresponding to the media in the logical set of media. One of ordinary skill in the art will recognize that the information extracted may include other types of information relevant to the presentation of the logical set of media on the infinite navigable media wall. In one or more embodiments of the present invention, information missing from the media in the logical set of media may be retrieved from remote databases in accordance with one or more embodiments of the present invention.

In step S10, the infinite navigable media wall is generated. The infinite navigable media wall is a dynamic graphical display and interface that represents the media in the logical set of media. Graphic files corresponding to the media in the logical set of media are placed in a tiled pattern so as to form a virtual wall to be displayed on the display of the computer. Further, in one or more embodiments of the present invention, the wall is generated such that the graphic files fill the viewable portion of the software application on the display of the computer. The graphic files are placed according to a pattern. In one or more embodiments of the present invention, the pattern is a predetermined pattern of the software application. In one or more embodiments of the present invention, the pattern is random placement according to a random number generator. In one or more embodiments of the present invention, the pattern is random placement according to one or more metrics related to the media in the logical set of media. However, in one or more embodiments of the present invention, the generation of the infinite navigable media wall places the graphic files in a pattern that ensures that there are no duplicates in the visible portion of the infinite navigable media wall. However, in the event there is not enough media in the logical set of media to fill the wall without duplicates, or the user has navigated the wall in a manner that has extended beyond the ability to populate the wall with unique media, duplicates may be used. One of ordinary skill in the art will recognize that any other pattern may be utilized in accordance with one or more embodiments of the claimed invention.

The user can interact with the wall by, for example, gesturing to move the wall in any direction, zoom in on the wall, or zoom out on the wall by way of a touch screen interface. In one or more embodiments of the present invention, the accelerometers of the computer allow the user to move the wall by rotating the computer. When the user gestures to move the wall or rotates the computer, the wall is dynamically generated in the direction indicated by the gestured command or rotation. As such, the term infinite is not intended to convey its traditional mathematical meaning. Instead, the term infinite means that, to the extent the operating system, software application, and/or the display of the computer supports such action, the user may continue to move the wall in any direction and the wall is dynamically generated in near real-time. In this way, the user may browse the media in the logical set of media by interacting with the infinite navigable media wall. In one or more embodiments of the present invention, the infinite navigable media wall may be populated in advance with graphic files placed in a pattern where the pattern is larger than the viewable portion of the software application on the computer screen. Advantageously, the user may easily browse a large collection of media in a graphical manner.

Figure 3B:
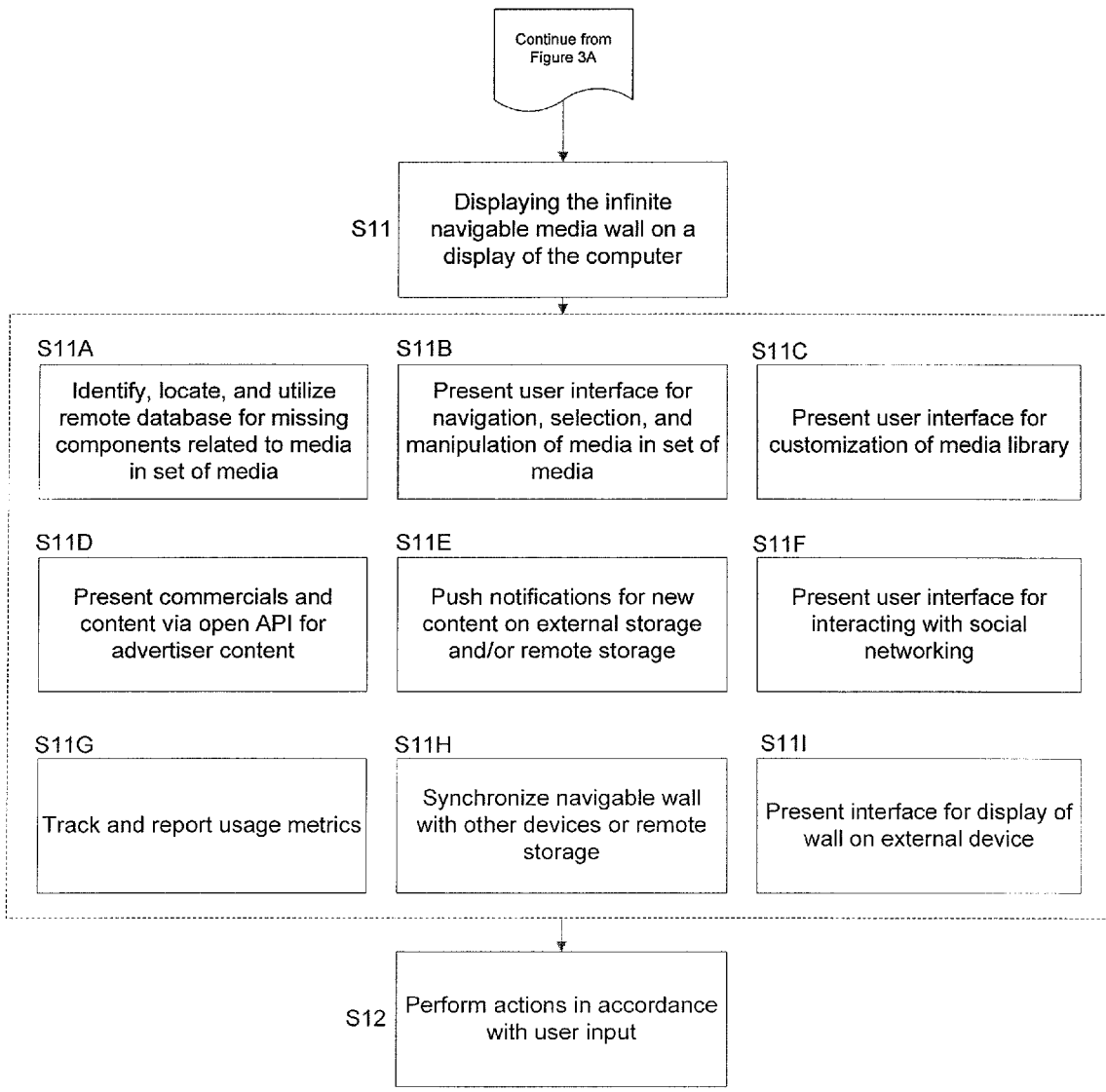

With reference to FIG. 3B, in step S11, the infinite navigable media wall is displayed on a display of the computer. Once the infinite navigable media wall is displayed, there are a variety of functions that may be invoked upon user interaction or by the software application itself. In step S11A, remote databases may be utilized to identify, locate, and utilize missing components related to the media in the logical set of media. For example, a remote database may be employed to provide a missing graphical file representing the media or any other missing data relating to the media. In one or more embodiments of the present invention, the software application could be remotely instructed to shift the display of the infinite navigable media wall or to control the display of the infinite navigable media wall. In one or more embodiments of the present invention, the infinite navigable media wall can be configured to scroll or otherwise move automatically at the direction of the software application. In one or more embodiments of the present invention, the infinite navigable media wall may scroll or otherwise move the infinite navigable media wall during playback for improved visual effect. For example, when media is selected and playing, the infinite navigable media may be moved in a visually pleasing manner.

In step S11B, the infinite navigable media wall presents a user interface for navigating, selecting, and manipulating the media in the logical set of media. For example, a user may navigate the infinite navigable media wall by gesturing on the wall through the touch screen interface of the computer. The user can move the wall in any direction, zoom in on the wall, or zoom out on the wall. In one or more embodiments of the present invention, the accelerometers of the computer allow the user to navigate the infinite navigable media wall by rotating the computer in the desired direction. Moreover, the user can select media and invoke a variety of functions related to the use of the selected media.

For example, a software button may allow the user to express a preference to sort the media in the logical set of media. Should the user, for example, express a preference to sort by alphabetical order of artist names, the user can invoke that preference and the infinite navigable media wall is dynamically regenerated in accordance with the preference. Further, for example, a software button may allow the user to express a preference for what media is in the logical set of media by way of filtering. Should the user, for example, choose to restrict audio content to a specific genre, the user can invoke that preference and the infinite navigable media wall is dynamically regenerated in accordance with the preference. One of ordinary skill in the art will recognize that any such preference may be invoked via software buttons displayed on the infinite navigable media wall in accordance with one or more embodiments of the present invention.

Further, the user interface allows for the selection of media in the logical set of media. For example, if a user browses the wall and finds media of interest, the user can use the gesture interface of the touch screen of the display of the computer to select the media. The media is then enlarged from the wall and the user is presented with options for manipulating the media. For example, in the case of audio media, should the user select an album by touching the graphic file representing an album cover, the album cover is enlarged and the user is presented with options to play, stop, fast forward, reverse, manipulate, or purchase the selected media. In one or more embodiments of the present invention, if the wall includes albums, by selecting an album, the album cover is enlarged, the user is presented with the above-noted options, and a song from the album may begin playing by default. The songs may be played in order of appearance, randomly, or as specified by the software application. While the album cover is enlarged, if the user touches the enlarged album cover, the cover is reversed and a list of songs on the album is revealed. The user may then select any song from the list of songs on the selected album.

In step S11C, a software button may allow the user to customize the media library. For example, in the case where the logical set of media includes media from remote storage, the user may wish to purchase the media through the software application and add it to the local media library. Similarly, the user may wish to delete media from the logical set of media or from the internal storage of the computer itself. One of ordinary skill in the art will recognize that any such customization of the media library may be invoked via software buttons displayed on the infinite navigable media wall in accordance with one or more embodiments of the present invention.

In step S11D, commercials and other content may be delivered via the infinite navigable media wall through an application program interface for advertising content. For example, the logical set of media may be utilized to present advertisements of related media that may be of interest to the user. Further, commercials may be displayed at the invocation of the software application or during runtime of the application at regular intervals or upon events that dictate their execution. In one or more embodiments of the present invention, geolocalization of the computer may be utilized to customize the infinite navigable media wall according to proximity to a third-party. In one or more embodiments, the available media used to generate the infinite navigable media wall may be provided by a third-party identified by geolocalization. For example, a user in close proximity to a third-party store may allow, through geolocalization, the third-party to present some or all of the media presented through the infinite navigable media wall.

In step S11E, if new content is added to external storage and/or remote storage, notifications may be pushed to the infinite navigable media wall such that the wall is dynamically regenerated and the newly added content is considered for inclusion in the logical set of media. In step S11F, software buttons may present an interface to social networking sites. For example, a user may elect to share his currently playing media title with Facebook®, Google+®, or Twitter®. A user may elect to share a playlist of media to Facebook®, Google+®, or Twitter®. A user may elect to share media via Facebook®, Google+®, Twitter®, email, SMS, instant messaging applications, or WI-FI networks. In one or more embodiments of the present invention, a user may be able to share a tile from the infinite navigable media wall via social networking sites, email, SMS, instant messaging applications, or WI-FI networks. One or ordinary skill in the art will recognize that there are many ways in which the infinite navigable media way may interface with social networking sites and facilitate sharing in accordance with one or more embodiments of the present invention.

In step S11G, usage metrics relating to user history of interaction with the infinite navigable media wall may be tracked and reported. For example, most recently played media, most frequently played media, and other metrics may be tracked and reported. In one or more embodiments, the reported metrics may be utilized to drive targeted advertising to the user or to suggest similar media available for purchase that the user may be interested in based on the reported metrics. In step S11H, the infinite navigable media wall may be synchronized with other devices or remote storage. For example, the infinite navigable media wall can be utilized to synchronize media in the logical set of media displayed on the wall with another device or remote storage. Alternatively, media on another device or remote storage may be utilized to synchronize with the infinite navigable media for inclusion in the logical set of media displayed on the infinite navigable media wall. In step S11I, the infinite navigable media wall may include an interface for display of the wall on an external device. The external device may be another computer, a television, or any other display device. In step S12, the infinite navigable media wall performs actions in accordance with user input.

In one or more embodiments of the present invention, some or all of the above-noted steps may be implemented. Further, in one or more embodiments of the present invention, some or all of the above-noted steps may be performed in a different order depending on the configuration of the software application and/or user interaction with the software application. Moreover, in one or more embodiments of the present invention, one or more of the above-noted steps may be repeated as required to present the infinite navigable media wall in accordance with the configuration of the software application and/or user interactions with the software application.

With respect to FIGS. 4 through 10, audio media is utilized, for purposes of illustration only, to generate the screenshots of a software application that performs the above-noted method. One of ordinary skill in the art will recognize that any media could be utilized in the same manner as that of the audio media utilized in the following examples.

FIG. 4 shows screenshots of a portrait view of an infinite navigable media wall in accordance with one or more embodiments of the present invention. With reference to FIG. 4A, upon invocation of the application, the above-noted method is executed and the user is presented with the infinite navigable media wall comprised of graphical representations of audio content. If the user gestures to move the wall left, by swiping a finger to the right of the touch screen display of the display of the computer, the infinite navigable media wall is moved to the left and the wall is dynamically regenerated as shown in FIG. 4B.

Figure 5:
FIGS. 5A-5B show a screenshot of a zoomed in view of an infinite navigable media wall and a zoomed out view of the infinite navigable media wall in accordance with one or more embodiments of the present invention.
Figure 5:
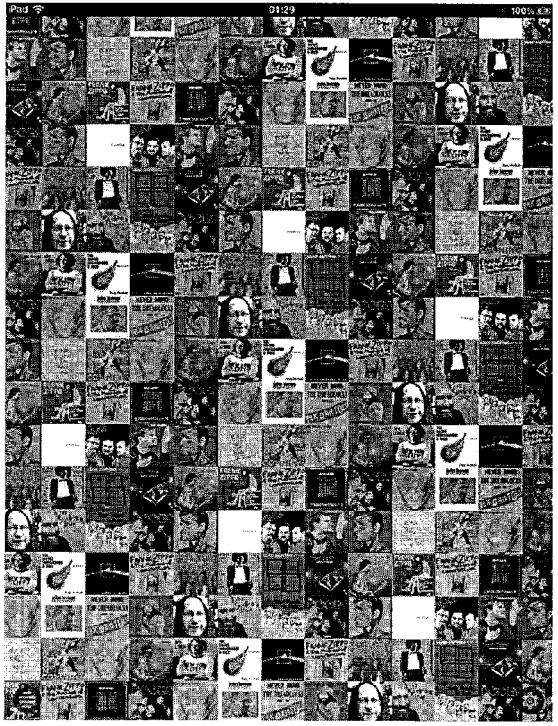

FIG. 5 shows screenshots of zoomed in and zoomed out views of an infinite navigable media wall in accordance with one or more embodiments of the present invention. With reference to FIG. 5A, a user may gesture to zoom in on the wall and the wall is resized in accordance with the zoom in gesture. With reference to FIG. 5B, a user may gesture to zoom out on the wall and the wall is resized in accordance with the zoom out gesture. When the zoom out gesture is implemented, the wall is dynamically generated to fill the viewable space of the display.

Figure 6:
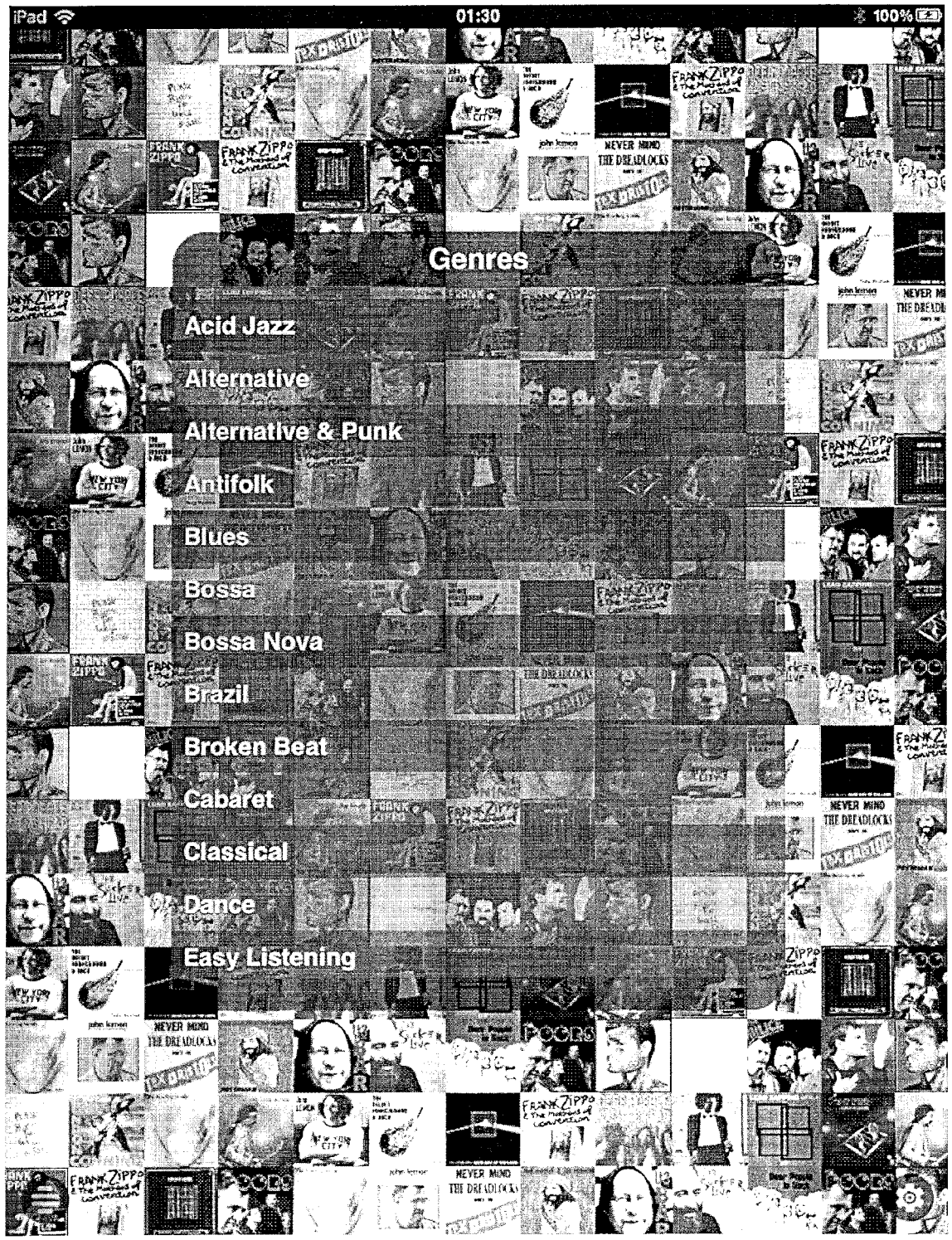
FIG. 6 shows a screenshot of a genre filter invoked from an infinite navigable media wall in accordance with one or more embodiments of the present invention.

FIG. 6 shows a screenshot of a genre filter invoked from an infinite navigable media wall in accordance with one or more embodiments of the present invention. If the user gestures to select the software button displayed on the bottom left of the wall, a genre filter is presented. The user may scroll through the list of genres and select a genre of interest. Upon expressing a preference for a genre, the logical set of media is filtered according to the genre preference and the infinite navigable media wall is dynamically regenerated in accordance with the preference. One of ordinary skill in the art will recognize that the filter can be directed to any metric related to the media in the logical set of media displayed on the wall.

Figure 7:
FIG. 7 shows a screenshot of selected media invoked from an infinite navigable media wall in accordance with one or more embodiments of the present invention.

FIG. 7 shows a screenshot of selected media invoked from an infinite navigable media wall in accordance with one or more embodiments of the present invention. If the user gestures to select a graphical representation of an album present on the infinite navigable media wall, the album cover is enlarged and the user is presented with options for playing, stopping, pausing, fast forwarding, reversing, manipulating, and/or purchasing the selected media. In one or more embodiments of the present invention, upon selecting an album cover, a song begins to play. The song may be the first song appearing on the corresponding album, a random song from the corresponding album, or a predetermined song from the corresponding album. If the album is not on internal storage, but is part of remote storage, the first song played may be a song specified by the remote storage or an advertising directive.

Figure 8:
FIG. 8 shows a screenshot of a detailed view of selected media invoked from an infinite navigable media wall in accordance with one or more embodiments of the present invention.

FIG. 8 shows a screenshot of a detailed view of selected media invoked from an infinite navigable media wall in accordance with one or more embodiments of the present invention. If the user touches the album cover enlarged as shown in FIG. 7, the album cover reverses to reveal a track listing for the selected album. The user may then scroll through the list of songs on the selected album to select the song the user wishes to play.

Figure 9:
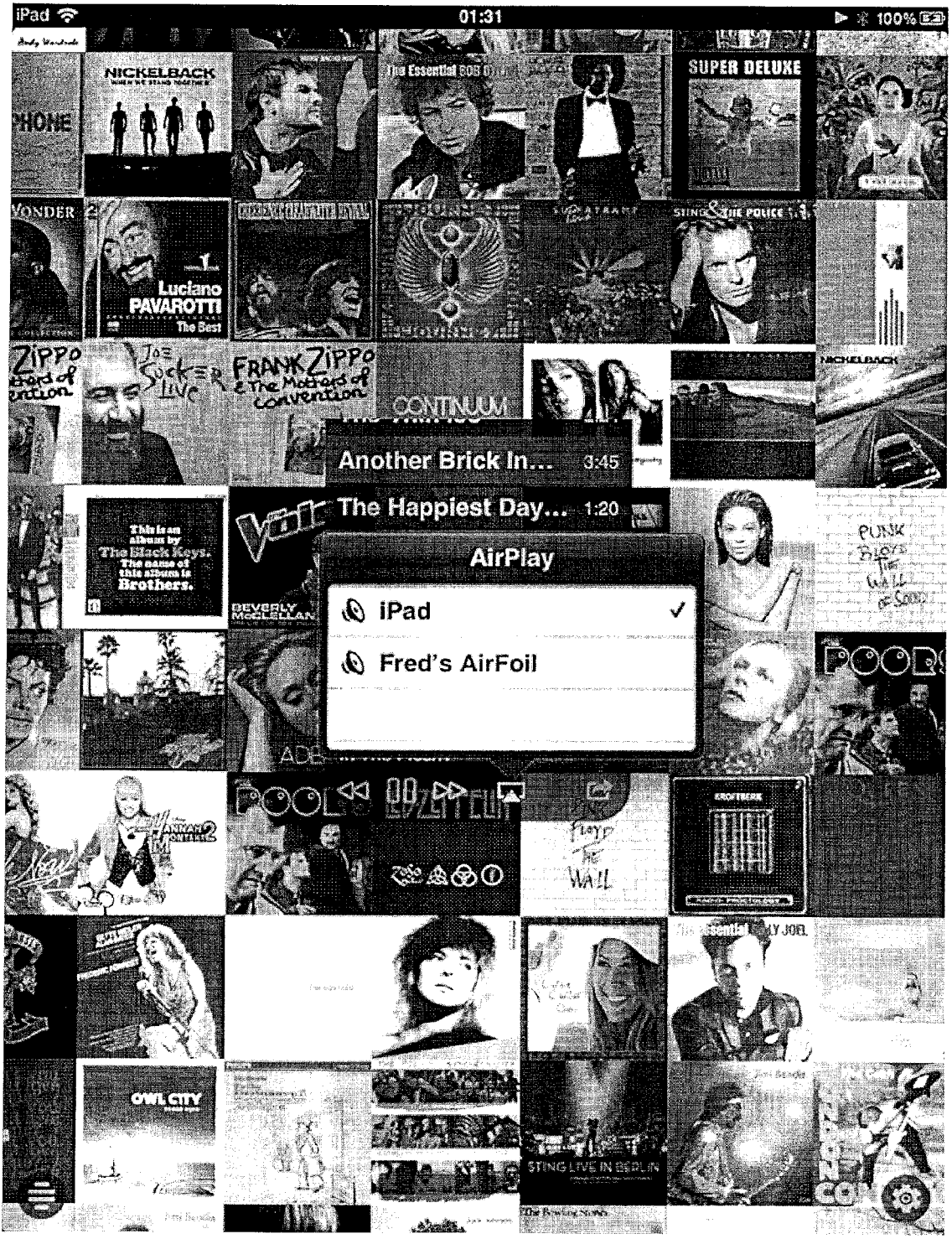
FIG. 9 shows a screenshot of an output selector invoked from an infinite navigable media wall in accordance with one or more embodiments of the present invention.

FIG. 9 shows a screenshot of an output selector invoked from an infinite navigable media wall in accordance with one or more embodiments of the present invention. If the user wishes to direct the playback of the selected content to an alternative playback device, such as a wireless speaker, another computer, or another playback device, the user may invoke a preference to play the selected content on the alternative playback device.

Figure 10:
FIG. 10 shows a screenshot of a landscape view of an infinite navigable media wall in accordance with one or more embodiments of the present invention.

FIG. 10 shows a screenshot of a landscape view of an infinite navigable media wall in accordance with one or more embodiments of the present invention. If the user rotates the computer that includes accelerometers, like an iPad®, the infinite navigable wall rotates to landscape view and dynamically regenerates the wall as needed. When rotated, the infinite navigable media wall in landscape view works in the same manner as the infinite navigable media wall in portrait view.

Advantages of one or more embodiments of the present invention may include one or more of the following.

In one or more embodiments of the present invention, the method of creating, displaying, and interfacing an infinite navigable media wall provides a more intuitive interface for browsing, utilizing, or creating libraries of media.

In one or more embodiments of the present invention, the method of creating, displaying, and interfacing an infinite navigable media wall provides a customizable interface for the presentation and sale of media to a user.

In one or more embodiments of the present invention, the method of creating, displaying, and interfacing an infinite navigable media wall provides a wall representation of a media library that, regardless of the amount of media in the library, appears to be continuous and infinite.

In one or more embodiments of the present invention, the method of creating, displaying, and interfacing an infinite navigable media wall provides an interface that facilitates the purchasing, sharing, and manipulation of media.

While the invention has been described with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A computer implemented method comprising:
   identifying available media from storage accessible by the computer;
   generating a logical set of media from the available media;
   generating a wall consisting of a tiled pattern of graphic files corresponding to media in the logical set of media;
   displaying at least a portion of the wall that fills a viewable portion of a display of the computer; and
   changing the at least portion of the wall displayed based on a user gesture.

2. The method of claim 1, further comprising sorting the logical set of media according to a preference.

3. The method of claim 1, further comprising filtering the logical set of media according to a preference.

4. The method of claim 1, wherein the pattern is based on a metric related to media in the logical set of media.

5. The method of claim 1, wherein the pattern is a random pattern.

6. The method of claim 1, wherein the user gesture is a gesture to move the wall.

7. The method of claim 1, wherein the user gesture is a gesture to zoom in on the wall.

8. The method of claim 1, wherein the user gesture is a gesture to zoom out on the wall.

9. The method of claim 1, wherein the user gesture is a gesture to select a media.

10. The method of claim 1, wherein the wall is dynamically generated in the direction indicated by the user gesture.

11. The method of claim 1, wherein the graphic files correspond to album covers.

12. The method of claim 1, wherein the graphic files correspond to photos.

13. The method of claim 1, wherein the graphic files correspond to videos.

14. The method of claim 1, wherein the graphic files correspond to documents.

15. A non-transitory computer-readable medium comprising software instructions that, when executed by a processor, performs a method comprising:

identifying available media from storage accessible by a computer;

generating a logical set of media from the available media;

generating a wall consisting of a tiled pattern of graphic files corresponding to media in the logical set of media;

displaying at least a portion of the wall that fills a viewable portion of a display of the computer; and changing the at least portion of the wall displayed based on a user gesture.

16. The computer-readable medium of claim 15, further comprising sorting the logical set of media according to a preference.

17. The computer-readable medium of claim 15, further comprising filtering the logical set of media according to a preference.

18. The computer-readable medium of claim 15, wherein the pattern is based on a metric related to media in the logical set of media.

19. The computer-readable medium of claim 15, wherein the pattern is a random pattern.

20. The computer-readable medium of claim 15, wherein the user gesture is a gesture to move the wall.

21. The computer-readable medium of claim 15, wherein the user gesture is a gesture to zoom in on the wall.

22. The computer-readable medium of claim 15, wherein the user gesture is a gesture to zoom out on the wall.

23. The computer-readable medium of claim 15, wherein the user gesture is a gesture to select a media.

24. The computer-readable medium of claim 15, wherein the wall is dynamically generated in the direction indicated by the user gesture.

25. The computer-readable medium of claim 15, wherein the graphic files correspond to album covers.

26. The computer-readable medium of claim 15, wherein the graphic files correspond to photos.

27. The computer-readable medium of claim 15, wherein the graphic files correspond to videos.

28. The computer-readable medium of claim 15, wherein the graphic files correspond to documents.

\* \* \* \* \*